US008701829B1

(12) United States Patent
Wyne

(10) Patent No.: US 8,701,829 B1
(45) Date of Patent: Apr. 22, 2014

(54) PORTABLE TREE STAND STEP

(76) Inventor: Brian K. Wyne, Muncie, IN (US)

(*) Notice: Subject to any disclaimer, the term of this patent is extended or adjusted under 35 U.S.C. 154(b) by 81 days.

(21) Appl. No.: 13/595,032

(22) Filed: Aug. 27, 2012

(51) Int. Cl.
*A01M 31/00* (2006.01)
*E06C 9/00* (2006.01)

(52) U.S. Cl.
USPC .............................. 182/136; 182/90; 182/187

(58) Field of Classification Search
USPC ............................................ 182/187, 90, 136
See application file for complete search history.

(56) References Cited

U.S. PATENT DOCUMENTS

| 3,531,113 | A | * | 9/1970 | Alexander et al. | 482/114 |
|---|---|---|---|---|---|
| 3,961,686 | A | * | 6/1976 | Starkey | 182/187 |
| 4,867,272 | A | | 9/1989 | Troubridge | |
| 5,509,499 | A | * | 4/1996 | Prejean | 182/93 |
| 5,624,008 | A | | 4/1997 | Beardslee, Jr. | |
| 5,662,555 | A | * | 9/1997 | Cloutier | 482/23 |
| 5,704,447 | A | * | 1/1998 | Doyle | 182/90 |
| 5,743,353 | A | | 4/1998 | Browning et al. | |
| 6,688,088 | B1 | * | 2/2004 | Aweeka, Jr. | 54/46.1 |
| 6,719,093 | B2 | | 4/2004 | Garbs | |
| 6,988,588 | B2 | | 1/2006 | Prejean | |
| 7,044,896 | B2 | * | 5/2006 | Hetrick | 482/95 |
| 7,066,300 | B2 | | 6/2006 | Sylvia | |

OTHER PUBLICATIONS

Guide Gear Extreme Deluxe Climber Tree Stand. Amazon.com. http://www.amazon.com/Guide-Gear-Extreme-Deluxe-Climber/dp/tags-on-product/B003O2862A.

* cited by examiner

*Primary Examiner* — Alvin Chin Shue
(74) *Attorney, Agent, or Firm* — Montgomery Patent & Design; Robert C. Montgomery

(57) ABSTRACT

A portable tree stand step providing assistance to hunters when entering and exiting hunting tree stands includes a rope fastened to a lower frame of the tree stand. The rope forms a pair of flexible stepping loops that hang downwardly and into which the hunter can step, thereby allowing the hunter to enter the tree stand. Additionally, each stepping loop of the portable tree stand step is supplied with a foot pad and a length adjustment mechanism, allowing the hunter to position and securely step upon the foot pad when entering the stand.

11 Claims, 3 Drawing Sheets

PORTABLE TREE STAND STEP

RELATED APPLICATIONS

Not Applicable.

FIELD OF THE INVENTION

The present invention relates generally to portable tree stands, and in particular, to a length adjustable step that is attachable to portable tree stands for use in hunting.

BACKGROUND OF THE INVENTION

Over the years, modern advances in hunting equipment have enhanced the sport, providing hunters with increased success. Although many of these products are high-technology devices, some products are amazingly simple. An example of one (1) of these products is the tree stand. A tree stand is used to form a stable surface in a tree upon which the hunter may sit or even stand. It allows the hunter to remain elevated and nearly invisible to his prey for long periods of time in relative comfort.

However, access into and out of such tree stands rely on the hunter climbing or "hugging" the tree in order to access the elevated seat. While perhaps not a problem for young hunters, disabled or elderly hunters have a difficult time. While ladders, step stools and the like can be used, these items are heavy and must be transported into and out of the hunting spot perhaps forcing multiple trips. Accordingly, there exists a need for a means by which a hunting tree stand may be more easily accessed without the disadvantages as described above.

SUMMARY OF THE INVENTION

In view of these disadvantages, the inventor has recognized a lack in the art and observed that there is a need for an attachable step and a method of attachment for use with portable tree stands. The development of the present invention, which will be described in greater detail herein, substantially departs from conventional solutions to provide a new portable tree stand step and in doing so fulfills this need.

In accordance with features and aspects of one exemplary embodiment consistent with the principles of the present disclosure, a portable tree stand step is provided that can include a length of rope having a first end, an opposing second end, and a center disposed between the first end and the second end. A first slide fastener is connected to the rope first end having a plurality of apertures to receive and frictionally retain the rope. A second slide fastener is connected to the rope second end also having a plurality of apertures to receive and frictionally retain the rope. A first foot pad is attached to the rope between the first end and the center. The first footpad includes a generally rectangular section of flexible strap material, a pair of apertures disposed through opposing ends of the strap material, and a grommet fastened to a perimeter of each of the pair of apertures. A second foot pad is attached to the rope between the second end and the center. The second footpad also includes a generally rectangular section of flexible strap material, a pair of apertures disposed through opposing ends of the strap material, and a grommet fastened to a perimeter of each of the pair of apertures. The first end is configured to loop around a first side of a lower frame of a portable tree stand and is securable to the first slide fastener. The second end is configured to loop around an opposing second side of the lower frame of the portable tree stand and is securable to the second slide fastener. The rope center is configured to loop around a middle location of the lower frame of the portable tree stand to define a first step and a second step. The first foot pad is disposed at a middle portion of the first step and the second footpad is disposed at a middle portion of the second step.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
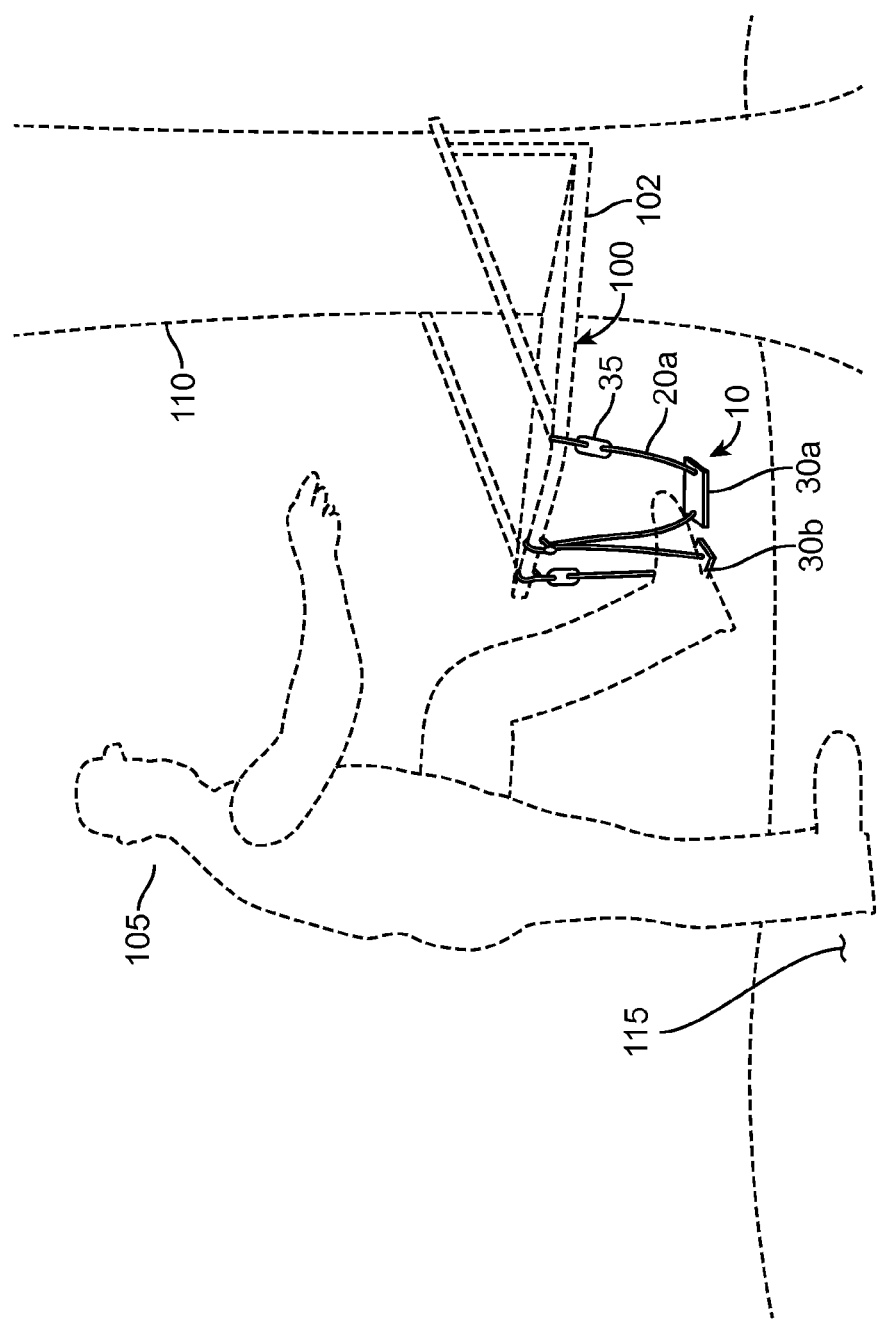
FIG. 1 is an environmental view of a portable tree stand step depicted in-use as attached to a portable tree stand, in accordance with the present invention.

DESCRIPTIVE KEY 10 portable tree stand step
20a first step
20b second step
21 rope
22a first side attachment loop
22b second side attachment loop
24 center attachment loop
26a first knot
26b second knot
26c center knot
30a first foot pad
30b second foot pad
32 grommet
35 length adjustment fixture
100 tree stand
102 lower frame
105 hunter
110 tree
115 ground surface

DETAILED DESCRIPTION OF THE PREFERRED EMBODIMENT

Figure 2:
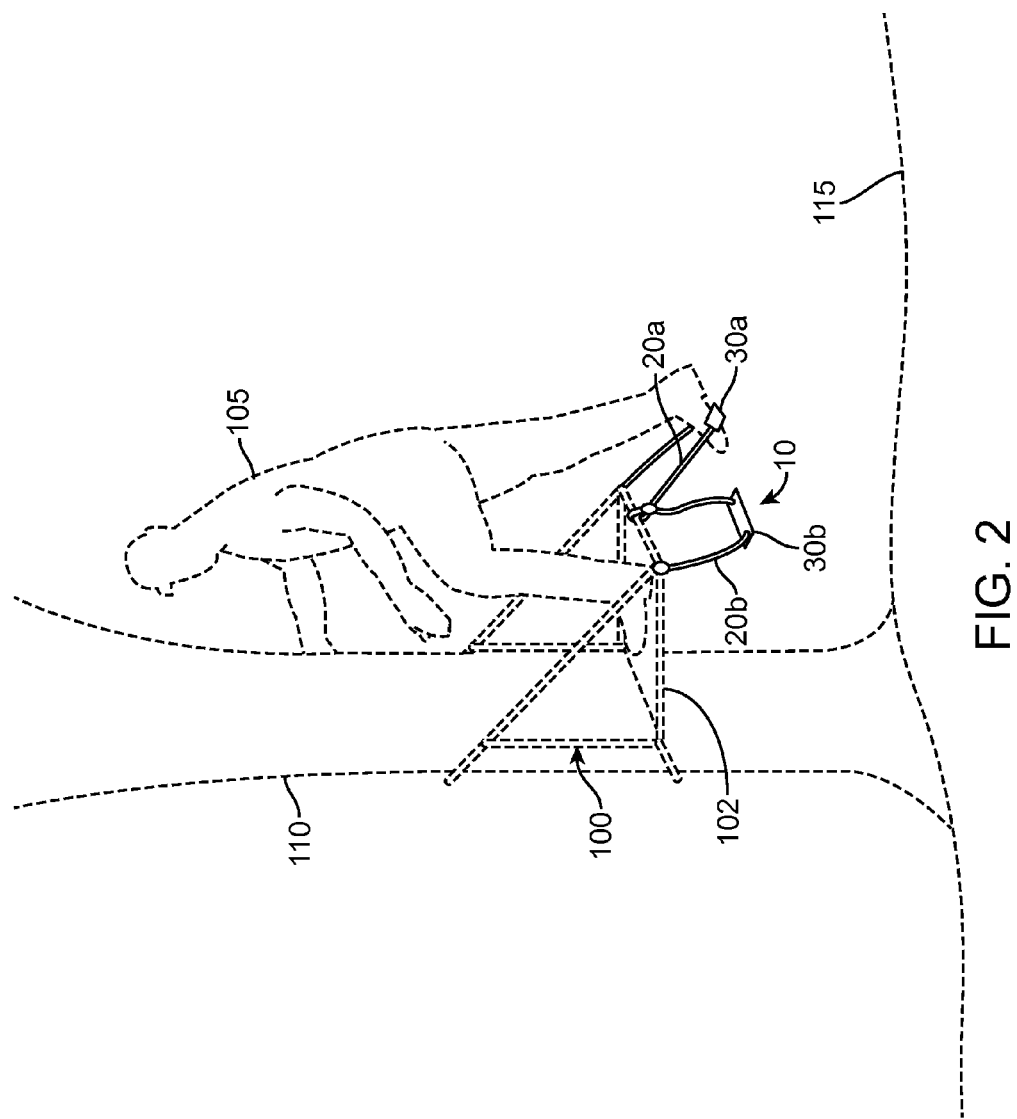
FIG. 2 is an environmental view of the portable tree stand step depicted in-use, in accordance with the present invention; and, FIG. 3 is a perspective view of the portable tree stand step depicted as attached to the portable tree stand, in accordance with the present invention.
Figure 3:
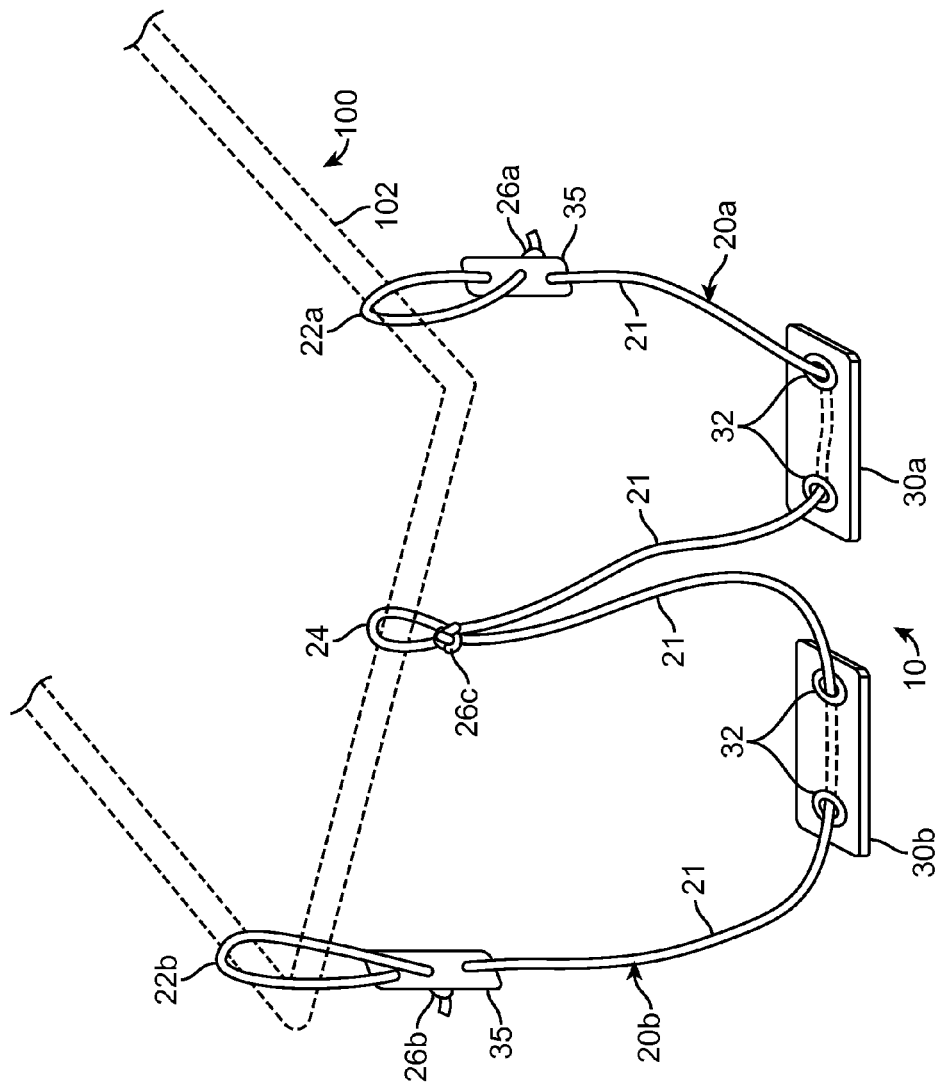

In accordance with the invention, the best mode is presented in terms of certain embodiments, herein depicted within FIGS. 1 through 3. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps or functions without precluding one or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 3, depicting a portable tree stand step, identified generally by reference to a device 10, where like reference numerals represent similar or like parts. In accordance with the teachings of the present disclosure, the device 10 generally provides an attachable step to assist hunters 105 as they climb into and out of a tree stand 100.

Referring first to FIGS. 1 and 2, which depict the device 10 in progressive in-use states. The device 10 is preferably made of a section of flexible rope 21 forming a length-adjustable first step 20a and second step 20b. The steps 20a, 20b are fastened to front end of a lower frame 102 of the tree stand 100. During use, the tree stand 100 is commonly positioned at approximately from waist height to shoulder height above a ground surface 115. The steps 20a, 20b support a hunter's boot at an approximate knee-high position above the ground surface 115 to allow the hunter to step onto and off from the tree stand 100. The flexible nature of the device 10 allows the steps 20a, 20b to adjust to a suitable size and shape to receive a large hunting boot while the hunter 105 climbs into the stand 100.

Referring next to FIG. 3, the device 10 includes a first step 20a which is formed by a first side attachment loop 22a and a first foot pad 30a. In a similar manner, the second step 20b is formed by a second side attachment loop 22b and a second foot pad 30b. The length of flexible rope 21 creates the steps 20a, 20b and side attachment loops 22a, 22b and is preferably approximately three-eighths inch (⅜ in.) in diameter. The rope 21 is fabricated using traditional materials such as hemp, nylon, or the like. The side attachment loops 22a, 22b provide for attachment of the respective steps 20a, 20b to opposing sides of the lower frame 102 of the tree stand 100. Each side attachment loop 22a, 22b includes a length adjustment fixture 35 which provides for independent adjustment of the length of each side attachment loop 22a, 22b, to varying a distance at which the respective first foot pad 30a and second foot pad 30b are suspended above the ground surface 115.

Opposing ends of the rope 21 are looped around opposing sides of the lower frame 102 of the tree stand 100. Each end of the rope 21 is routed through a respective length adjustment fixture 35 to produce an arresting friction attachment and is secured using a respective first knot 26a and second knot 26b. The length adjustment fixture 35 is preferably a slide fastener similar to a fastening device used on tents, awnings, and the like which utilize devices such as runners, toggles, and the like to adjustably secure the ends of the rope 21 to the body of the rope to adjust each step 20a, 20b at a desired height.

The rope 21 is also attached to the lower frame 102 at an intermediate frontal position by forming a center attachment loop 24 at a midpoint of steps 20a, 20b. The center attachment loop 24 is secured tightly to the lower frame 102 using a center knot 26c. Although the steps 20a, 20b are illustrated here at approximately the same suspended length, it can be appreciated that one step 20a, 20b can be positioned above or below the other step 20a, 20b, thereby providing the hunter 105 with a two-step method of climbing onto the tree stand 100.

The footpads 30a, 30b are generally flat, rectangular sections of heavy-duty nylon strapping material approximately six inches (6 in.) to eight inches (8 in.) in length by approximately two inches (2 in.) in width. Each foot pad 30a, 30b includes a pair of integral metal grommets 32 positioned adjacent to each opposing end. The rope 21 is routed through the grommets 32 along a bottom surface of the footpads 30a, 30b to form the stepping loop of each step 20a, 20b where the footpads 30a, 30b provide a stable centralized stepping surface. It is further envisioned that the materials used to make the various parts of the device 10 be of a black or camouflage color to avoid being noticed by game animals.

The lightweight nature of the device 10 allows easy carrying by the hunter 105 or alternatively to remain attached to the tree stand 100, if desired, during the trek into and out of a hunting area. The use of the device 10 provides hunters 105 who hunt from tree stands 100 a method of easily accessing the stand 100 and is envisioned to be especially useful for hunters 105 having physical limitations or weakness in their legs.

It can be appreciated by one skilled in the art that other styles and configurations of the present invention can be easily incorporated into the teachings of the present disclosure and only certain particular configurations have been shown and described for purposes of clarity and disclosure and not by way of limitation of scope.

In accordance with the principles of the present invention, the device 10 can be installed and utilized by the user in a simple and effortless manner with little or no training in general accordance with FIG. 1 through FIG. 3. It can be appreciated that the steps required to install and utilize the device 10, as described, can performed in alternative order and as such should not be viewed as a limiting factor.

The method of installing and utilizing the device 10 can be achieved by performing the following steps: procuring a model of the device 10 having a desired camouflage color; installing the footpads 30a, 30b upon interior portions of the rope 21 corresponding to the position of respective loop steps 20a, 20b, if not previously installed, by routing the rope 21 through the grommets 32; attaching the device 10 to an installed tree stand 100 positioned between waist height and chest height by forming the center attachment loop 24 by looping an intermediate portion of rope 21 around a front middle portion of the lower frame 102 and securing thereto using a center knot 26c; attaching ends of the rope 21 to opposing sides of the lower frame 102 to form the steps 20a, 20b; securing the side attachment loops 22a, 22b around the sides of the lower frame 102 by routing ends of the rope 21 around the lower frame 102 and through apertures of the respective length adjustment fixtures 35; affixing the length adjustment fixture's 35 in position upon the rope 21 by tying respective first 26a and second 26b knots; adjusting a hanging length of each step 20a, 20b individually by sliding the respective length adjustment fixtures 35 along the length of the rope 21 to increase or decrease the length of the respective side attachment loop 22a, 22b until obtaining a desired length of each step 20a, 20b; utilizing the device 10 to enter the tree stand 100 by inserting one foot into one of the steps 20a, 20b; inserting a remaining foot into the remaining step 20a, 20b; and, stepping up onto the tree stand 100.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A portable tree stand step comprising:
    a length of rope comprising a first end, an opposing second end, and a center disposed between said first end and said second end;
    a first length adjustment fixture connected to said rope first end;
    a second length adjustment fixture connected to said rope second end;
    a first foot pad attached to said rope between said first end and said center; and,
    a second foot pad attached to said rope between said second end and said center;
    wherein said first end is looped around a first side of a lower frame of a portable tree stand and is securable to said first length adjustment fixture, said second end is looped around an opposing second side of said lower frame of said portable tree stand and is securable to said second length adjustment fixture, and said center is looped around a middle location of said lower frame of said portable tree stand to define a first step and a second step.

2. The portable tree stand step of claim 1, wherein said first foot pad and said second foot pad each comprises:
    a generally rectangular section of flexible strap material;
    a pair of apertures disposed through opposing ends of said strap material; and,
    a grommet fastened to a perimeter of each of said pair of apertures.

3. The portable tree stand step of claim 1, wherein said first length adjustment fixture and said second length adjustment feature each comprises a slide fastener having a plurality of apertures to receive and frictionally retain said rope.

4. The portable tree stand step of claim 1, wherein said rope first end is secured to said first length adjustment fixture by a knot.

5. The portable tree stand step of claim 1, wherein said rope second end is secured to said second length adjustment fixture by a knot.

6. The portable tree stand step of claim 1, wherein said rope center is secured to said middle location of said lower frame of said portable tree stand by a knot.

7. A portable tree stand step comprising:
    a length of rope comprising a first end, an opposing second end, and a center disposed between said first end and said second end;
    a first slide fastener connected to said rope first end comprising a plurality of apertures to receive and frictionally retain said rope;
    a second slide fastener connected to said rope second end comprising a plurality of apertures to receive and frictionally retain said rope;
    a first foot pad attached to said rope between said first end and said center, said first footpad comprising a generally rectangular section of flexible strap material, a pair of apertures disposed through opposing ends of said strap material, and a grommet fastened to a perimeter of each of said pair of apertures; and,
    a second foot pad attached to said rope between said second end and said center, said second footpad comprising a generally rectangular section of flexible strap material, a pair of apertures disposed through opposing ends of said strap material, and a grommet fastened to a perimeter of each of said pair of apertures;
    wherein said first end is looped around a first side of a lower frame of a portable tree stand and is securable to said first slide fastener, said second end is looped around an opposing second side of said lower frame of said portable tree stand and is securable to said second slide fastener, and said center is looped around a middle location of said lower frame of said portable tree stand to define a first step and a second step; and,
    wherein said first foot pad is disposed at a middle portion of said first step and said second foot pad is disposed at a middle portion of said second step.

8. The portable tree stand step of claim 7, wherein said rope first end is secured to said first slide fastener by a first knot.

9. The portable tree stand step of claim 8, wherein said rope second end is secured to said second slide fastener by a second knot.

10. The portable tree stand step of claim 9, wherein said rope center is secured to said middle location of said lower frame of said portable tree stand by a center knot.

11. A method of attaching length adjustable steps to a frame of a portable tree stand, said method comprising the steps of:
    providing a length of rope comprising a first end, an opposing second end, and a center disposed between said first end and said second end;
    providing a first slide fastener connected to said rope first end comprising a plurality of apertures to receive and frictionally retain said rope;
    providing a second slide fastener connected to said rope second end comprising a plurality of apertures to receive and frictionally retain said rope;
    providing a first foot pad attached to said rope between said first end and said center, said first footpad comprising a generally rectangular section of flexible strap material, a pair of apertures disposed through opposing ends of said strap material, and a grommet fastened to a perimeter of each of said pair of apertures;
    providing a second foot pad attached to said rope between said second end and said center, said second footpad comprising a generally rectangular section of flexible strap material, a pair of apertures disposed through opposing ends of said strap material, and a grommet fastened to a perimeter of each of said pair of apertures;

looping said rope center around a middle location of a lower frame of said portable tree stand;

securing said rope center to said middle location of said lower frame of said portable tree stand;

looping said rope first end around a first side of said lower frame of a portable tree stand to form a first step having said first foot pad at a middle position of said first step;

securing said rope first to said first slide fastener;

looping said rope second end around an opposing second side of said lower frame of a portable tree stand to form a second step having said second foot pad at a middle position of said second step; and, securing said rope second to said second slide fastener.

* * * * *